(12) United States Patent
Kranz

(10) Patent No.: US 6,765,970 B2
(45) Date of Patent: Jul. 20, 2004

(54) METHOD AND APPARATUS FOR PREVENTING INTERFERENCE

(75) Inventor: Christian Kranz, Ratingen Lintorf (DE)

(73) Assignee: Infienon Technologies AG, Munich (DE)

(*) Notice: Subject to any disclaimer, the term of this patent is extended or adjusted under 35 U.S.C. 154(b) by 29 days.

(21) Appl. No.: 10/298,427

(22) Filed: Nov. 18, 2002

(65) Prior Publication Data

US 2003/0076895 A1 Apr. 24, 2003

Related U.S. Application Data

(63) Continuation of application No. PCT/DE01/01630, filed on Apr. 26, 2001.

(30) Foreign Application Priority Data

May 17, 2000 (DE) .......................................... 100 24 375

(51) Int. Cl.[7] .............................. H04L 25/03; H03D 1/04
(52) U.S. Cl. ........................................ 375/296; 375/346
(58) Field of Search ................................ 375/296, 346, 375/348, 224, 222, 285, 284, 254; 370/351, 281

(56) References Cited

U.S. PATENT DOCUMENTS 4,430,736 A * 2/1984 Scholz ........................ 714/747
4,914,439 A    4/1990 Nakahashi et al.
5,367,536 A * 11/1994 Tsujimoto ................... 375/269
5,966,684 A    10/1999 Richardson et al.

FOREIGN PATENT DOCUMENTS

| DE | 33 07 309 C2  | 9/1984  |
|----|---------------|---------|
| DE | 690 06 370 T2 | 11/1992 |
| EP | 0 513 002 B1  | 11/1992 |
| EP | 0 596 663 A2  | 5/1994  |
| JP | 01005121      | 1/1989  |
| JP | 07249990 A    | 9/1995  |
| WO | WO 90/13188   | 11/1990 |

OTHER PUBLICATIONS

Zölzer, U.: "Digitale Audiosignalverarbeitung" [Digital Audio Signal Processing], B. G. Teubner, Stuttgart, 1997, pp. 38–42.

* cited by examiner

*Primary Examiner*—Khai Tran
(74) *Attorney, Agent, or Firm*—Laurence A. Greenberg; Werner H. Stemer; Gregory L. Mayback

(57) ABSTRACT

The invention relates to a method and an apparatus for preventing interference, particularly in telecommunications systems operating in burst mode, where the interference arises particularly when the signal has a signal level below a threshold level value and/or the signal has a constant amplitude over time. An artificial interference signal having at least one interference signal frequency is added in the processing path in the system so that the signal level exceeds the threshold level value or at least one amplitude that is constant over time is prevented.

18 Claims, 1 Drawing Sheet

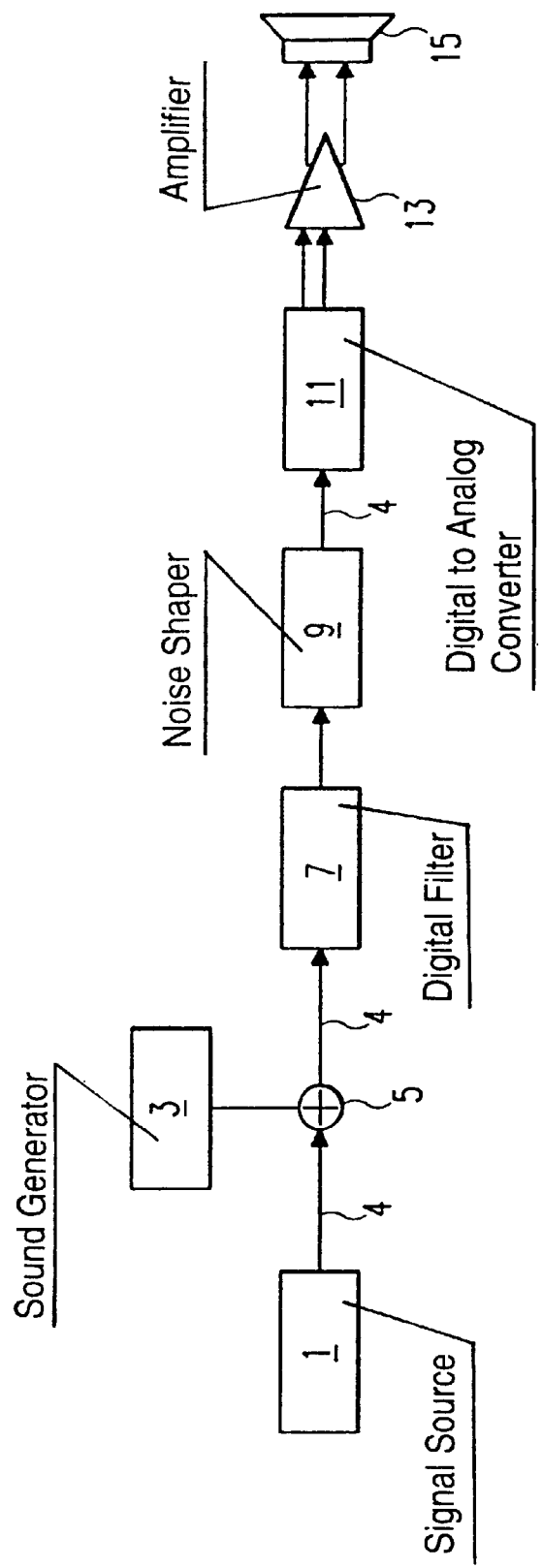

METHOD AND APPARATUS FOR PREVENTING INTERFERENCE

CROSS-REFERENCE TO RELATED APPLICATION

This application is a continuation of copending International Application No. PCT/DE01/01630, filed Apr. 26, 2001, which designated the United States and was not published in English.

BACKGROUND OF THE INVENTION

FIELD OF THE INVENTION

The invention relates to a method and an apparatus for preventing interference in systems processing discrete-amplitude signals, particularly in telecommunications systems operating in burst mode.

Particularly in the audio paths in such systems, interference can arise when the signal has a signal level below a threshold level value and/or the signal has a constant amplitude over time. The reason for this is because one or more processing units in the system react to the aforementioned characteristics of the signal being processed by generating an interference signal and/or by amplifying a signal that is present to an unwanted degree. The signal that is present is, by way of example, also an interference signal, for example, microphone noise, which is fed into the reception path in a telephone terminal.

A first example of such a processing unit is a digital filter that is arranged in the digital section of an audio path, i.e. upstream of a digital-analog converter (DAC) in the processing direction. Often, such filters are fed back to the input of the digital processing section, so that the problem of "limit cycles" arises: the filter reacts to a signal having such a low level by representing the discrete-amplitude signal as a zero signal by generating a cyclic signal. This interference signal is transmitted to the downstream processing units. The system is thus subject to unwanted interference.

A similar situation arises when a signal having an amplitude that is constant over time is present on the digital filter. In this case, the filter generates an interference signal that is superimposed on the signal that is present.

Another example of such a processing unit is a "noise shaper", which is normally connected upstream of a DAC in an audio path, as seen in the signal processing direction. The noise shaper is used to cut off or suppress noise signals having low level values. Noise shapers exist which react in the same way as the digital filter described above. There are also noise shapers that feed or inject interference signals into the processing path to an unwanted degree when the signal being processed that is present on the noise shaper has a level below a threshold level value. The interference signal is thus generated only when a user signal having a low level is present. With such interference in the system, signal-to-noise ratios are obtained that are much worse than the ratios demanded by the respective standard.

To solve this problem, it is known practice to use additional filter structures that filter out the interference signals. A drawback in this case is that such solutions are normally complex and hence cost-intensive.

It is also known practice to use "dither techniques". These involve injecting a dither signal in the signal processing direction upstream of the processing unit, which can cause the interference. The dither signal is a noise signal that is added, by way of example, in the digital processing path as a succession of random numbers. This technique is described, for example, in the book "Digitale Audiosignal-Verarbeitung" [Digital Audio Signal Processing], $2^{nd}$ edition, 1997, by Udo Zölzer, published by Teubner Verlag, Stuttgart, Germany (called Zölzer '97 for short below). Section 2.2.1 of this book explains dither techniques. The dither signal causes linearization of the quantization levels, i.e. of the levels of the signals' amplitude quantization. The aforementioned limit cycles can therefore be prevented even for signals that have a much lower signal level than the level that corresponds to the lowest quantization level.

However, a drawback of the dither techniques is that signal processing needs to be performed more accurately than is required for signal processing without a dither signal. This is manifested particularly by providing additional bits in a digital word in order to represent the dither random numbers. Accordingly, computation power needs to be provided and the processing units need to be of a complex design. This solution therefore also generates costs as a result of preventing the interference that is possible because of limit cycles or other effects.

SUMMARY OF THE INVENTION

It is accordingly an object of the invention to provide an apparatus and a method for preventing interference which overcome the above-mentioned disadvantages of the prior art apparatus and methods of this general type.

In particular, it is an object of the present invention to provide a method and an apparatus of the type mentioned in the introduction that allow the interference to be prevented and that are inexpensive to implement.

With the foregoing and other objects in view there is provided, in accordance with the invention, a method for preventing interference. The method includes steps of: providing a system for processing a discrete-amplitude signal in which interference occurs when the discrete-amplitude signal has a signal level below a threshold level value and/or when the discrete-amplitude signal has an amplitude that is constant over time, the system having a processing path; and adding an artificial interference signal having at least one interference signal frequency into the processing path of the system such that the signal level of the discrete-amplitude signal exceeds the threshold level value or such that at least an amplitude that is constant over time is prevented.

With the foregoing and other objects in view there is also provided, in accordance with the invention, an apparatus for preventing interference in a system for processing at least one discrete-amplitude signal in which the interference occurs when the discrete-amplitude signal has a signal level below a threshold level value and/or when the discrete-amplitude signal has an amplitude that is constant over time. The apparatus includes: a signal processing path having a section, the signal processing path configured such that the at least one discrete-amplitude signal can be processed and transmitted along the signal processing path; an interference signal generator for generating an artificial interference signal having at least one interference signal frequency; and a device for injecting and adding the interference signal into the section of the signal processing path.

The inventive method involves an artificial interference signal, having at least one interference signal frequency, which is added into the processing path in the system. For the situation in which the interference occurs when the signal has a signal level below a threshold level value, the signal level of the interference signal is chosen such that the signal level exceeds the threshold level value overall.

Preferably, the signal level of the interference signal is defined at a fixed value. However, the addition of the interference signal having at least one interference signal frequency ensures in each case that the signal amplitude is not constant over time. The previously described interference, in particular, can therefore be prevented.

An artificial interference signal having at least one interference signal frequency can be generated in a simple and hence inexpensive manner. In particular, the interference signal having at least one interference signal frequency can be generated in a particularly simple manner in the digital signal processing range, for example, by inserting individual bit values based on the at least one interference signal frequency into the signal being processed. This can be achieved by hardware and/or software solutions.

The invention is not limited to the addition of a digital interference signal, however. By way of example, the interference signal can be added in analog form, for example before or after the transmission of a user signal via a radio link. An analog interference signal generator for generating an interference signal having at least one interference signal frequency can also be implemented in a simple and hence inexpensive manner.

The invention is based on the insight that the previously described instances of interference can be prevented precisely by virtue of an interference signal, that is to say by adding an additional signal having at least one signal frequency. Although this introduces interference into the system again, this interference can be controlled in contrast to the interference that is prevented. In practice, it will therefore be necessary to ensure that the controllable interference can be tolerated in the respective application area. A fundamental advantage of the invention is thus that uncontrollable, sometimes temporally variable, interference is prevented and controllable interference can either be eliminated in a simple, reliable manner or can be adjusted such that it has no practical effects.

In contrast to dither techniques, it is not necessary for any additional computation power or processing power to be provided in order to prevent the unwanted interference. In particular, there is no need for any linearization of the quantization levels. It is thus possible to use cheaper processing units and/or to make more effective use of the available power.

In one development of the method, the added interference signal is a sound signal whose fundamental frequency essentially has a discrete value. An infinitely distinct, discrete value cannot be achieved for physical reasons, since the level of the sound signal has a finite value. A sound signal is understood to mean not just a signal which is at a frequency in the audible range, but rather a signal which corresponds to a sound in the more general sense, i.e. whose fundamental frequency essentially has a discrete value. Together with the fundamental frequency, higher frequencies corresponding to the associated harmonics can appear when generating the sound signal and/or when processing the sound signal further.

The use of a sound signal has the advantage that it can be generated in a particularly simple manner and that the interference signal is easy to identify from its fundamental frequency.

In one development of the method, the discrete-amplitude signal being processed in the system in which interference needs to be prevented is converted into an audio signal. Particularly in such systems, uncontrollable interference has a particularly harmful effect and usually cannot be tolerated.

By way of example, in the limit cycle, an uncontrollable sinusoidal signal or cyclic square-wave signal is generated which is converted into a clearly audible sound. This is prevented by the invention. Preferably, the interference signal added in accordance with the invention has a fundamental frequency that is outside the audible frequency range or outside the audio frequency range that is output or processed by the system. The interference intentionally generated in accordance with the invention thus has no negative effects or at most slightly audible effects in the audio signal.

One particularly preferred development refers to systems in which, depending on the system, a first interference signal is present in the processing path or is injected into it. These include, in particular, telecommunications systems in which digitized information is transmitted in packets, i.e. in "bursts". The individual bursts usually come at regular intervals, so that the transmission of bursts is repeated at a particular rate. This "burst repetition rate" is 100 Hz in systems based on the DECT (Digital Enhanced Cordless Telecommunications) standard, for example. Particularly actions in telephone terminals, for example inductive or capacitive effects, inject a corresponding interference signal into the signal-processing path. A first interference signal thus exists which has a first fundamental frequency and possibly further, higher frequencies (harmonics).

In accordance with the particularly preferred development of the inventive method, the second interference signal that is inventively added in the processing path has a second fundamental frequency or has a harmonic frequency. The second fundamental frequency or the frequency of the harmonic is equal to the frequency of the first fundamental frequency or is equal to one of the harmonics of the first fundamental frequency.

The potentially possible interference in the system, which in particular is caused by limit cycles is thus prevented by adding the second interference signal. The frequency of the second interference signal is matched to the frequency of the first interference signal, which is already present anyway, such that the added, second interference signal brings about no fundamental additional interference. Particularly when there is a conversion to audio signals, the additional interference is not audible or is barely audible.

In a development in which the interference to be prevented can be generated or concomitantly generated by a processing unit, arranged in the processing path in the system and where the first interference signal is present in the processing direction only at or downstream of the processing unit, the second interference signal is added in the processing direction upstream of or at the processing unit with an interference signal level that contributes a smaller proportion to the overall signal level downstream of the processing unit than the first interference signal. The interference signal is therefore barely perceptible.

The inventive apparatus for preventing interference in systems processing discrete-amplitude signals has the following: a section of a signal processing path, with one or more of the discrete-amplitude signals being processed and transmitted along the signal processing path; an interference signal generator for generating an artificial interference signal having at least one interference signal frequency, and a device for injecting and adding the interference signal into the section of the signal processing path.

Advantages and developments of the inventive apparatus can be seen directly in the description of the inventive method.

The apparatus is, in particular, a cordless telephone. Preferably, the section of the signal processing path into which the interference signal is added is designed to transmit the discrete-amplitude signal or signals.

One development of the apparatus has a signal processing unit for processing the discrete-amplitude signals that generates the interference in the absence of a signal having a sufficient level and/or in the presence of a signal having an amplitude that is constant over time. The device for injecting and adding the interference signal is arranged in the processing path upstream of or at the signal processing unit.

In particular, the signal processing unit is a digital filter or a digital noise shaper for cutting off signal components, particularly noise, having a low signal level.

Preferably, the interference signal generator is a sound generator for generating a sound signal whose fundamental frequency essentially has a discrete value.

Other features which are considered as characteristic for the invention are set forth in the appended claims.

Although the invention is illustrated and described herein as embodied in a method and apparatus for preventing interference, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

The drawing FIGURE is a schematic illustration of an audio path in the reception path of a DECT telephone.

DESCRIPTION OF THE PREFERRED EMBODIMENTS

Referring now to the sole drawing FIGURE, there is shown a signal source 1 that represents further components (not shown in more detail) of a DECT (Digital Enhanced Cordless Telecommunications) telephone, such as an antenna unit, an analog signal processing unit, and an analog-digital converter. A signal processing path 4 is used to transmit the signal from the signal source 1 to a loudspeaker 15. The output of the signal source 1 produces the signal as a discrete-amplitude signal in digitized form.

In the direction of the signal processing path 4, the signal arrives at a digital filter 7 for filtering out unwanted frequency components, a digital noise shaper 9 for removing noise having a low signal level, and a digital-analog converter (DAC) 11, in which the signal is converted into an analog audio signal. An amplifier 13 for amplifying the audio signal and a loudspeaker 15 for audibly outputting the amplified audio signal are located in the processing direction downstream of the DAC 11.

The digital filter 7 and the digital noise shaper 9 have the characteristic that they generate an unwanted interference signal and introduce it into the signal processing path 4 via their output when the signal level of the signal applied to their respective input is below a threshold level value and/or the signal has a constant amplitude over time.

To prevent the interference signal, a sound generator 3 is provided which generates an additional interference signal having a fundamental frequency of 50 Hz. The additional interference signal is injected into the signal processing path 4 using an adder 5, irrespective of whether the signal that is present at the output of the signal source 1 would result in the generation of the unwanted interference signal in the digital filter 7 and/or in the noise shaper 9.

The burst repetition rate of 100 Hz that is inherent to DECT systems means that capacitive, inductive and/or other effects feed interference of 100 Hz into the analog section of the signal processing path 4. This interference is therefore not yet applied to the input of the digital filter 7 and of the noise shaper 9, but rather only at or downstream of the DAC 11.

The fundamental frequency of the additional interference signal generated in the sound generator 3 has been chosen such that first, the fundamental frequency is in a frequency range that most people cannot perceive or can perceive only at high intensity. Second, the frequency of the first harmonic of a fundamental oscillation of 50 Hz is at the value 100 Hz. For that reason, any harmonic with this frequency generated in the sound generator 3 or along the signal processing path 4 is not perceived as an additional, disturbing sound when the audio signal is output by the loudspeaker 15, since its frequency is equal to the burst repetition rate.

In addition, the level of the additional interference signal generated in the sound generator 3 has been chosen to be so low that the digital filter 7 and the noise shaper 9 do not generate the unwanted interference signal, but the interference level in the analog section of the signal processing path 4 is not increased or is increased barely perceptibly.

As compared with known dither techniques in which the processing power needs to be increased when the digital signals are processed, the invention does not require an increase in the processing power and this saves costs. Alternatively, the increased processing power can be used to improve the signal-to-noise ratio. Thus, when the invention was implemented using a digital noise shaper, for example, as is also used when applying dither techniques, the signal-to-noise ratio was improved by +12 dB.

In a corresponding manner to that of the exemplary embodiment for a DECT telephone, the invention can also be used in other systems, such as in a GSM (Global System for Mobile Communication) or the UMTS (Universal Mobile Telecommunication System). Other examples are systems based on the Bluetooth standard and, quite generally, systems using TDMA (Time Division Multiple Access) transmission. When selecting the frequency of the interference signal that is added intentionally, the respective frequencies inherent to the system, particularly burst repetition rates, then need to be taken into account.

I claim:

1. A method for preventing interference, which comprises:
   providing a system for processing a discrete-amplitude signal in which interference occurs when the discrete-amplitude signal has a signal level below a threshold level value and/or when the discrete-amplitude signal has an amplitude that is constant over time, the system having a processing path; and
   adding an artificial interference signal having at least one interference signal frequency into the processing path of the system such that the signal level of the discrete-amplitude signal exceeds the threshold level value or such that at least an amplitude that is constant over time is prevented.

2. The method according to claim 1, which comprises providing the system for processing the discrete-amplitude signals as a telecommunications system for operating in burst mode.

3. The method according to claim 1, which comprises providing the interference signal as a sound signal with a fundamental frequency essentially having a discrete value.

4. The method according to claim 1, which comprises converting the discrete-amplitude signal into an audio signal.

5. The method according to claim 1, which comprises configuring the interference signal with a fundamental frequency situated outside an audible frequency range.

6. The method according to claim 1, which comprises configuring the interference signal with a fundamental frequency situated outside an audio frequency range being output or processed by the system for processing the discrete-amplitude signal.

7. The method according to claim 1, which comprises:
enabling a first interference signal to be present in the processing path, the first interference signal having a first fundamental frequency; and
performing the step of adding the artificial interference signal by adding an artificial second interference signal in the processing path, the second interference signal having a second fundamental frequency or a harmonic frequency being equal to the first fundamental frequency.

8. The method according to claim 7, which comprises providing the first fundamental frequency as a burst repetition rate of a digital communications link.

9. The method according to claim 7, which comprises:
configuring a processing unit in the processing path of the system for processing the discrete-amplitude signals;
performing the step of enabling the first interference signal to be present in the processing path by enabling the first interference signal to be present in the processing path only downstream from the processing unit with respect to a processing direction or only at and downstream from the processing unit with respect to the processing direction; and
performing the step of adding the second interference signal by adding the second interference signal upstream of the processing unit with respect to the processing direction or at the processing unit such that an interference signal level of the second interference signal contributes a smaller proportion to an overall signal level downstream of the processing unit than the first interference signal.

10. The method according to claim 1, which comprises:
enabling a first interference signal to be present in the processing path, the first interference signal having a first fundamental frequency and harmonic frequencies; and
performing the step of adding the artificial interference signal by adding an artificial second interference signal in the processing path, the second interference signal having a second fundamental frequency or a harmonic frequency being equal to the first fundamental frequency or one of the harmonic frequencies of the first interference signal.

11. An apparatus for preventing interference in a system for processing at least one discrete-amplitude signal in which the interference occurs when the discrete-amplitude signal has a signal level below a threshold level value and/or when the discrete-amplitude signal has an amplitude that is constant over time, the apparatus comprising:
a signal processing path having a section, said signal processing path configured such that the at least one discrete-amplitude signal can be processed and transmitted along said signal processing path;
an interference signal generator for generating an artificial interference signal having at least one interference signal frequency; and
a device for injecting and adding the interference signal into said section of said signal processing path.

12. The apparatus according to claim 11, in combination with the system for processing the at least one discrete-amplitude signal, wherein the system is a telecommunications system operating in a burst mode.

13. The apparatus according to claim 11, in combination with the system for processing the at least one discrete-amplitude signal, wherein:
the system is a cordless telephone; and
said section of said signal processing path is designed to transmit the at least one discrete-amplitude signal.

14. The apparatus according to claim 11, comprising:
a signal processing unit for processing the discrete-amplitude signal, said signal processing unit for generating interference in an absence of a signal having a sufficient level and/or in a presence of a signal having a constant amplitude over time;
said device for injecting and adding the interference signal being configured at said signal processing unit or in said signal processing path upstream of said signal processing unit with respect to a processing direction.

15. The apparatus according to claim 14, wherein said signal processing unit is a digital filter.

16. The apparatus according to claim 14, wherein said signal processing unit is a digital noise shaper for cutting off signal components.

17. The apparatus according to claim 14, wherein said signal processing unit is a digital noise shaper for cutting off noise having a low signal level.

18. The apparatus according to claim 11, wherein said interference signal generator is a sound generator for generating a sound signal having a fundamental frequency with an essentially discrete value.

* * * * *